United States Patent Office 2,898,973
Patented Aug. 11, 1959

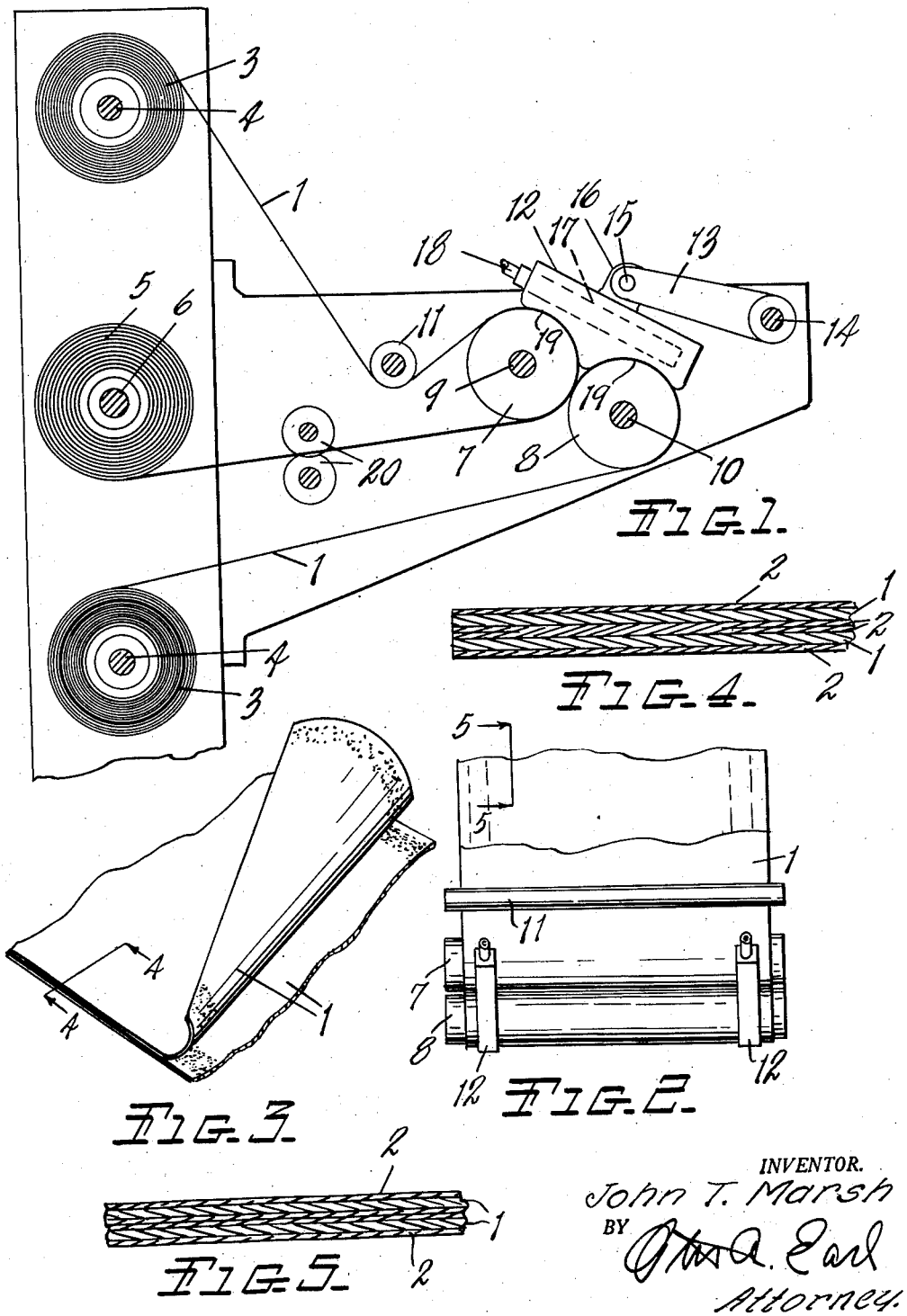

2,898,973
APPARATUS AND METHOD OF BONDING PAPER HAVING THERMOPLASTIC COATING

John L. Marsh, Kalamazoo, Mich., assignor to Kalamazoo Vegetable Parchment Company, Kalamazoo, Mich.

Application July 28, 1955, Serial No. 525,012

6 Claims. (Cl. 154—1)

This invention relates to the apparatus and method of bonding thermoplastic coated paper in laterally spaced strip-like zones or areas.

The main objects of this invention are:

First, to provide an apparatus for bonding paper in laterally spaced strip-like zones which is of very large capacity and at the same time results in a highly efficient bonding of the webs so that they may be cut into wrappers or sheets of the desired size for a wide variety of uses and the sheets separated should occasion require.

Second, to provide a machine or apparatus having these advantages which requires little care or attention on the part of the operator, the machine being substantially automatic in its operation.

Third, to provide a method of bonding webs of paper having thermoplastic coatings on at least one side thereof which results in a very secure bonding even though the coating may be relatively thin.

Objects relating to details and economies of the invention will appear from the description to follow. The invention is defined and pointed out in the claims.

A preferred embodiment of the invention is illustrated in the accompanying drawing, in which:

Fig. 1 is a diagrammatic view of an apparatus embodying my invention, means for driving the moving parts being omitted as they form no part of my invention and the gearing and driving connections may be greatly varied by those skilled in the art.

Fig. 2 is a fragmentary plan view of the right hand portion of Fig. 1, the bonding of the webs in laterally spaced strips or zones being conventionally illustrated.

Fig. 3 is a fragmentary perspective view of the webs with the bonding areas indicated thereon.

Fig. 4 is an enlarged sectional view on a line corresponding to line 4—4 of Fig. 3, the thickness of the paper and the coating material being greatly exaggerated for purpose of illustration.

Fig. 5 is a fragmentary sectional view on a line corresponding to line 5—5 of Fig. 2.

In the accompanying drawing I have illustrated only such parts of the machine as is deemed necessary to show the operating relationship of the parts. The supporting and driving means for the moving parts are omitted as they may be greatly varied and it is believed that suitable driving means will be readily understood by those skilled in the art.

The webs of paper 1—1 may vary greatly in character but the machine and method of my invention are desirable for use in bonding relatively thin or light paper.

In the embodiment illustrated the webs of paper are provided with coatings 2—2 on both sides thereof. This coating is of paraffine wax or other thermoplastic material. It is not desired to laminate or bond the plies throughout but only in laterally spaced strip-like zones.

Rolls 3 of the webs of paper are supported in vertically spaced relation on spindles 4. A roll of bonded paper is indicated at 5, this being supported by the driven spindle 6 for the purpose of winding the bonded webs.

The pressure rollers 7 and 8 are drivingly supported by the shafts 9 and 10 respectively. The driving means for these shafts are not illustrated but it will be understood that the rollers are driven in opposite directions. The webs 1 are trained around the rollers 7 and 8, a guide roller 11 being provided for the upper web, the purpose being to insure that the webs supportedly embrace substantial arcs of the pressure rollers.

Heating elements 12 are provided, these being supported in upright position by the arms 13 mounted on the rock shaft 14, the arms being pivotally connected at 15 to the upwardly projecting ears 16 disposed centrally of the heating elements. Each heating element is provided with a heating unit 17 indicated by dotted lines. The connection for the heating elements are indicated at 18.

The heating elements have concave face portions 19 of substantial arc which are opposed to substantial arcs of the web supporting portions of the rollers. Desirably the heating elements lightly contact or floatingly contact the webs and are shaped and positioned so that they heat and fuse the coating on the opposed faces of the webs in advance of the nip of the rollers so that the fused coatings are pressed together by the rollers. This insures an effective bond for the webs in the restricted zones. The remainder of the coatings are not affected by the bonding. The heating elements are laterally spaced according to the desired spacing of the bonded strips. In Fig. 1 slitting rollers 20 are illustrated disposed with the winding rollers and the pressure rollers.

The bonded material is cut into sheets of the desired size for the particular uses. Some uses make it desirable to separate the sheets during some manipulation of a packaged product, for example, a product prepared for deep freezing in which the bonded sheets are used as separators or partition members for predetermined food portions. In such uses the bonded sheets may be readily separated so that each portion or serving has a sheet on each side thereof.

In Fig. 3 I illustrate the strip bonding of a section of the webs. I have not attempted to illustrate various uses of the bonded material as it has a wide range of uses, it is desirable to coat the webs on both sides to render them moisture and grease proof.

The method of my invention results in a very effective bonding even when the thermoplastic coatings are relatively thin as the coating of both webs or sheets are fused and the fused coatings pressed together.

Having thus described my invention, what I claim as new and desire to secure by Letters Patent is:

1. An apparatus for bonding webs of paper having continuous preset thermoplastic coatings on the inner sides thereof, the apparatus comprising, a pair of coacting pressure rollers through the nip of which the webs are passed and by which they are pressed together, means for supporting the webs in advance of the rollers so that the webs are in wrapped upon supported engagement with substantial arcs of the rollers in advance of the nip thereof relative to the direction of rotation of the rollers as the webs are supportedly translated around the rollers, and laterally spaced relatively narrow heating elements disposed in embracing relation to substantial arcs of the rollers and having arcuately curved faces concentric to the rollers and embracing substantial arcuately supported portions of the webs as they are translated around the rollers and so that strip-like areas of the coatings are all fused and brought into pressure engagement as the webs are bonded to each other only by laterally spaced strips of the fusedly united coating thereof.

2. An apparatus for bonding webs of paper having continuous preset thermoplastic coatings on the inner sides thereof, the apparatus comprising, a pair of coacting pressure rollers through the nip of which the webs are passed and by which they are pressed together, means for supporting the webs in advance of the rollers so that the webs are in wrapped upon supported engagement with substantial arcs of the rollers in advance of the nip thereof relative to the direction of rotation of the rollers as the webs are supportedly translated around the rollers, and heating elements disposed in embracing relation to substantial arcs of the rollers and having arcuately curved faces concentric to the rollers and embracing substantial arcuately supported portions of the webs as they are translated around the rollers and so that strip-like areas of the coatings are all fused and brought into pressure engagement as the webs are bonded to each other.

3. An apparatus for bonding webs of paper at least one of which has a continuous heat fusible coating on the inner side thereof, a pair of coacting pressure rollers through the nip of which the webs are passed and by which they are pressed together, at least one web having a heat fusible coating thereon and being in wrapped around supported engagement with a substantial arc of one of the rollers with the coating facing outwardly in advance of the nip of the rollers, and laterally spaced relatively narrow heating elements disposed in opposed relation to the roller over which the web having the heat fusible coating is translated, said heating elements having arcuately curved faces concentric to such roller and embracing substantial portions of the web as it is supportedly translated around the roller and a strip of the coatings are fused and the fused coating of the one web is brought into pressure engagement with the other web as the webs pass through the nip of the rollers and the webs are thereby bonded to each other, and laterally spaced strips extending longitudinally of the webs.

4. An apparatus for bonding webs of paper at least one of which has a continuous heat fusible coating on the inner side thereof, a pair of coacting pressure rollers through the nip of which the webs are passed and by which they are pressed together, at least one web having a heat fusible coating thereon and being in wrapped around supported engagement with a substantial arc of one of the rollers in advance of the nip of the rollers, and a heating element disposed in opposed relation to the roller over which the web having the heat fusible coating thereon is translated, said heating element having a curved face opposed to such roller and embracing a substantial portion of the web as it is supportedly translated around the roller and at least a strip of the coating is fused and the fused coating of the one web is brought into pressure engagement with the other web as the webs pass through the nip of the rollers and the webs are thereby bonded to each other, and laterally spaced strips extending longitudinally of the webs.

5. An apparatus for bonding webs of paper having on the inner sides thereof a continuous preset thermoplastic coating, the apparatus comprising a pair of coacting pressure rollers through the nip of which the webs are passed and by which they are pressed together, the rollers being of such length that the webs are supported throughout the width thereof, the webs as they are advanced being in wrapped-upon supported engagement with substantial arcs of the rollers in advance of the nip of the rollers, and laterally spaced relatively narrow heating elements disposed in opposed relation to substantial arcs of the rollers and having arcuately curved faces concentric to the rollers and embracing substantial portions of the webs as they are translated around the rollers and so that fused areas of the coating thereof are brought into pressure engagement as the webs pass through the nip of the rollers and the webs are bonded to each other only by laterally spaced strips of the fusedly united coating thereof.

6. An apparatus for bonding webs of paper having on the inner sides thereof a continuous preset thermoplastic coating, the apparatus comprising a pair of coacting pressure rollers through the nip of which the webs are passed and by which they are pressed together, the rollers being of such length that the webs are supported throughout the width thereof, the webs as they are advanced being in wrapped-upon supported engagement with substantial arcs of the rollers in advance of the nip of the rollers, and heating elements disposed in opposed relation to substantial arcs of the rollers and having arcuately curved faces concentric to the rollers and embracing substantial portions of the webs as they are translated around the rollers and so that fused areas of the coating thereof are brought into pressure engagement as the webs pass through the nip of the rollers and the webs are bonded to each other.

References Cited in the file of this patent

UNITED STATES PATENTS

| | | |
|---|---|---|
| 1,133,440 | Leisel | Mar. 30, 1915 |
| 1,977,060 | Hayward | Oct. 16, 1934 |
| 2,162,769 | Williams | June 20, 1939 |
| 2,224,370 | Wescott | Dec. 10, 1940 |
| 2,237,346 | Gilfillan | Apr. 8, 1941 |
| 2,255,397 | Sidebotham | Sept. 9, 1941 |
| 2,387,566 | Custers | Oct. 23, 1945 |
| 2,395,077 | Southwick | Feb. 19, 1946 |
| 2,434,541 | Bierer | Jan. 13, 1948 |
| 2,614,953 | Anglada | Oct. 21, 1952 |
| 2,718,915 | Piazze | Sept. 27, 1955 |